June 30, 1970 A. L. HELGESSON 3,518,567

SEQUENTIAL FREQUENCY COMBINER FOR FREQUENCY STANDARD SYSTEMS

Filed Aug. 5, 1968 3 Sheets-Sheet 1

INVENTOR.
ALAN L. HELGESSON
BY
Wm Nolan
ATTORNEY

INVENTOR.
ALAN L. HELGESSON
BY Wm J. Nolan
ATTORNEY

SEQUENTIAL FREQUENCY COMBINER FOR FREQUENCY STANDARD SYSTEMS

Filed Aug. 5, 1968 3 Sheets-Sheet 3

INVENTOR.
ALAN L. HELGESSON
BY Wm J. Nolan
ATTORNEY

United States Patent Office 3,518,567
Patented June 30, 1970

3,518,567

SEQUENTIAL FREQUENCY COMBINER FOR FREQUENCY STANDARD SYSTEMS

Alan L. Helgesson, Los Altos Hills, Calif., assignor to Varian Associates, Palo Alto, Calif., a corporation of California Continuation-in-part of application Ser. No. 600,501, Dec. 9, 1966. This application Aug. 5, 1968, Ser. No. 750,393
Int. Cl. H03b *3/04;* H03k *17/00*
U.S. Cl. 331—2 6 Claims

ABSTRACT OF THE DISCLOSURE

A sequential frequency combiner for plural frequency standards is disclosed. In the frequency combiner the outputs from the plural frequency standards are maintained in a phase locked relationship with one of the standards which operates as the master. The master provides the output of the combiner. This combiner also includes circuits for monitoring the master standard and for sequentially changing masters upon a failure of the acting master standard. Such an improved frequency combiner is especially useful in, but not limited in use to, a world wide system of frequency standards employed for tracking, commanding, and communicating with manned space craft.

The invention described herein was made in the performance of work under a NASA contract and is subject to the provisions of section 305 of the National Aeronautics and Space Act of 1958, Public Law 85–568 (72 Stat. 435; 42 U.S.C. 2457).

The present application is a continuation-in-part application of parent U.S. application 600,501, filed Dec. 9, 1966, assigned to the same assignee as the present invention and now abandoned.

DESCRIPTION OF THE PRIOR ART

Heretofore, frequency combiners have been proposed which would provide redundancy and, thus, reliability in the frequency standard system. One such combiner employed a rotating mechanical resolver for each frequency standard. The resolvers were operable upon the output signals derived from each of the separate frequency standards to provide plural identical frequency signals which were simultaneously combined to provide one output signal. In another frequency combiner, the outputs from plural standards are added together and averaged in the combiner to provide an output corresponding to the average frequency of the plural standards, thereby providing increased precision and reliability.

SUMMARY OF THE PRESENT INVENTION

In the present invention, the outputs from plural frequency standards are applied to the frequency combiner. The frequency combiner selects one of the standards as the master and uses its output as the output of the combiner. The combiner also phase locks (slaves) the other frequency standards to the master standard such that the combiner can shift sequentially from one standard to another without producing a frequency or time shift in the output of the combiner.

The principal object of the present invention is the provision of an improved frequency combiner for frequency standard systems.

One feature of the present invention is the provision of a frequency combiner where in the outputs from plural frequency standards are accepted by the combiner, the combiner selecting one as its output and master standard and serving to phase lock the other standards to the master and including means for sensing a failure of the master and automatically shifting to another one of the standards as its master, whereby the precision and reliability of the frequency standard system is enhanced.

Another feature of the present invention is the provision of a programmer integral with the frequency combiner for automatically sequentially switching master control from one standard to one of the other standards in accordance with a predetermined preference.

Another feature of the present invention is provision of monitoring and inhibiting circuits which monitor the slaved standards and prevent the combiner from selecting as a new master such ones of the standards which are not within a certain phase range of the acting master standard, whereby frequency or time jumps in the output are not introduced in switching from one master to another.

Another feature of the present invention is the provision of a narrow band crystal filter connected into the output of the combiner such that upon failure of the master standard and during the switching interval the crystal will provide a decaying transient output at the output frequency of sufficient duration to span the switching interval such that the output of the combiner is not lost during the switching interval from one master to another.

Another feature of the present invention is a signal amplitude monitoring circuit which monitors the amplitude of the master standard and in the event this amplitude falls below a predetermined level automatically switches the master control to the next frequency standard.

Other features and advantages of the present invention will become apparent upon a perusal of the following specification taken in connection with the accompanying drawing wherein:

DESCRIPTION OF THE PREFERRED EMBODIMENTS

Figure 1:
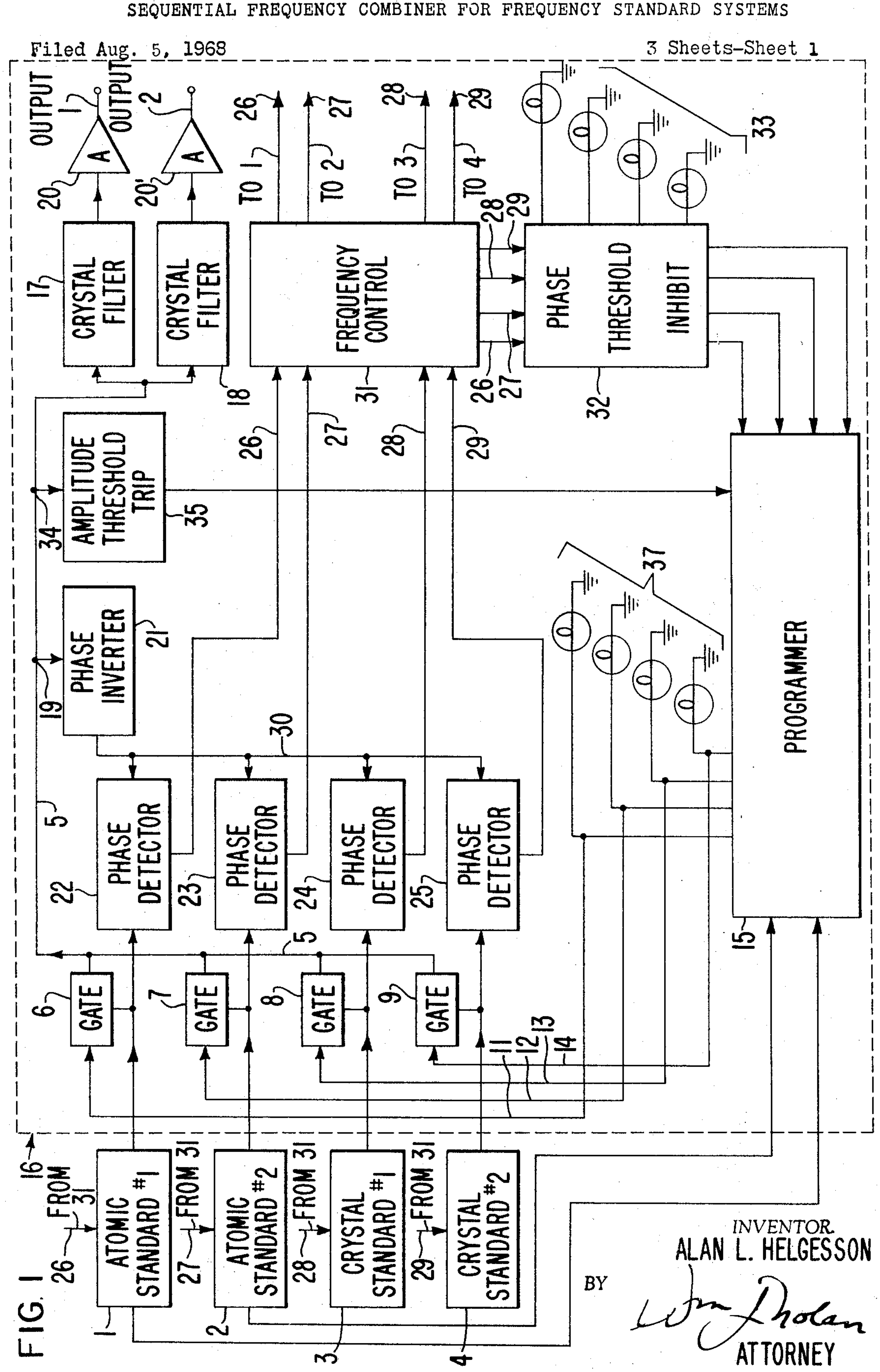
FIG. 1 is a schematic block diagram of the frequency combiner of the present invention.

Referring now to the drawing four frequency standards 1, 2, 3 and 4 each have their outputs fed to a bus 5 via the intermediary of gates 6, 7, 8 and 9. The gates 6–9 are, for example, diode switches which are controlled via outputs 11, 12, 13 and 14 of a preference programmer 15. The programmer 15 is preset and programmed such that only one of the gates 6–9 is open at any one time, whereby only one of the outputs from the standards 1–4 is applied to the bus 5 at any one time. This output, which is applied to the bus 5, serves as a master signal and is the output signal of the combiner 16. However, the output signal at a convenient frequency, as of 5 mHz., is passed through a narrow band pass crystal filter 17 tuned to the output frequency of the combiner and standards 1–4. Actually, the output of the combiner is also taken through a second identical crystal filter 18 in parallel, for redundancy in case of failure of one of the crystal filters 17 or 18. Amplifiers 20 and 20′ are connected in the parallel outputs for amplifying the output signals.

A portion of the master signal is taken from the bus 5 at 19 and inverted by a 180° phase shifter 21 and fed via bus 30 to one input of a series of phase detectors 22, 23, 24 and 25. The outputs of the four frequency standards are applied to the other set of input terminals to the phase detectors 22–25. The outputs 26, 27, 28 and 29 are D.C. signals proportional to the phase difference between the master signal from the master standard and the respective ones of the other standards 1–4.

The phase difference outputs 26–29 are fed back to tuning circuits in the respective standards 1–4 via frequency control circuit 31 for phase locking (slaving) the other standards to the selected master standard. The frequency control circuit 31 also provides outputs 26–29 to a phase threshold inhibitor circuit 32. The threshold inhibitor circuit compares the outputs 26–29 against internal reference signals to determine if one or more of the standards 1–4 is more than some predetermined amount out of phase with the master standard. For example, in one typical combiner 16, the inhibitor circuit gave an inhibiting output if a particular standard did not have a phase within ±12° of the phase of the selected master standard.

The outputs of the phase threshold inhibitor circuit 32 are fed to the preference programmer 15 to prevent the programmer 15 from selecting a new master standard which is excessively out of phase with the master standard. Lamps 33 are connected into the threshold inhibitor circuit 32 to indicate when and which ones of the various standards 1–4 are excessively out of phase with the master standard.

Another sample of the master output signal is taken from the bus 5 at 34 and fed to an amplitude threshold trip circuit 35. Circuit 35 compares the amplitude of the master signal against an internal reference. If the amplitude falls below a certain predetermined level, circuit 35 sends an output signal to the preference programmer 15 to cause the programmer to select the next preferred standard as the master.

In addition, one or more of the frequency standards 1–4 such as, for example, atomic standards 1 and 2 also include internal monitoring circuits for locking the output frequency of the standard to an atomic resonance line of a sample of matter such as Rb or Cs within the standard. This internal monitoring circuit provides an output alarm signal if the standard becomes unlocked from its atomic resonance line. These alarm signals are also fed to the preference programmer 15 to cause a shift from that particular standard if it happens to be the master or to inhibit selection of this standard if it is not the master.

In the event the programmer 15 makes a switch from a first standard as the master to a second standard as the master, it is desired that the output signal of the combiner be continued during the transition switching period. Accordingly, the crystal filters 17 and 18 are designed to have a sufficiently high Q such that their decay time constant is about 40 to 50$\mu$ seconds. The gates 6–9 are switched in about 10$\mu$ seconds. Thus, there is ample time for detection of a failure of the master standard and for the programmer 15 to switch to a new master during the ringing time of the crystal filters 17 and 18.

Indicator lamps 37 are connected into the gate circuits 6–9 to indicate which one of the standards 1–4 is operating as the master standard.

The programmer 15 includes manually operable switches for pre-setting the preferred switching sequence or for manually switching master control from one standard to another. However, the inhibitor circuit 32 and the unlock alarm signals are not overridden by the manual switches.

Figure 2:
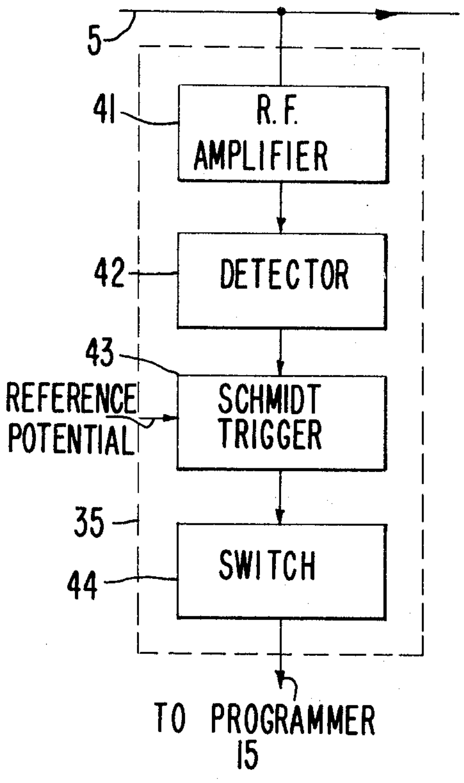
FIGS. 2, 3, 4A, 4B and 5 are circuit diagrams for portions of the circuit of FIG. 1.

Referring now to FIG. 2, there is shown in schematic block diagram form, the electronic circuitry for the amplitude threshold trip 35. The amplitude threshold trip 35 includes an R.F. amplifier 41 which samples a portion of the R.F. on the output line 5, amplifies same and feeds the amplified signal to a R.F. detector 42. The detector 42 detects the R.F. to produce a D.C. output signal having an amplitude in proportion to the amplitude of the R.F. signal on the output line 5. The D.C. signal from the detector 42 is fed to the input of the Schmitt trigger 43 which serves as a threshold detector for giving an output signal when the detected D.C. input level falls below a certain reference potential level which may be provided by either an external reference potential input or by an internal reference in the Schmitt trigger circuit 43. The output of the Schmitt trigger is fed to a switch 44 which switches the operating potential onto a multivibrator contained within the programmer 15, as more fully described below with regard to FIG. 5.

As an alternative to the particular amplitude threshold trip circuitry of FIG. 2, circuit 35 may comprise, for example, an R.F. detector and a conventional threshold detector such as, for example, a Fairchild $\mu$ A–710 Comparator as described in the Fairchild application bulletin APP–116 of February 1966, p. 8, FIGS. 13 and 14.

Figure 3:
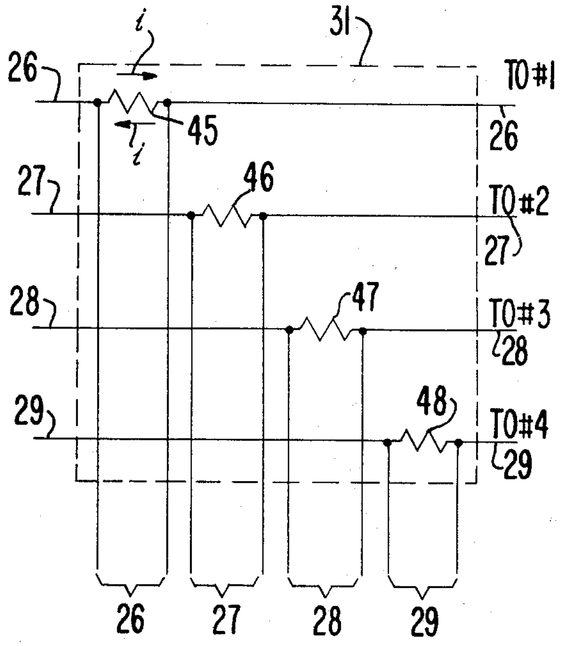

Referring now to FIG. 3, there is shown the internal circuitry of the frequency control circuit 31. Each of the output lines 26, 27, 28 and 29 from the phase detectors 22–25, respectively, includes a series resistor 45–48 for developing a D.C. potential thereacross in accordance with the output of the phase detectors 22–25, respectively. The amplitude and sense of the potential developed across the resistors 45–48 varies in proportion to the out of phase condition between the respective frequency standard 1–4 and that one of the frequency standards which is operating as the master at any given time. These D.C. output signals on output lines 26–29 are fed directly back to the frequency standards 1–4 for tuning the standards 1–4 to the precise phase of the master. The D.C. signals produced across the resistors 45–48 are sampled via the T conections in lines 26–29 which are connected across the respective resistors 45–48. These output voltages are fed to the input of the phase threshold inhibit circuit 32.

Figures 4A, 4B:
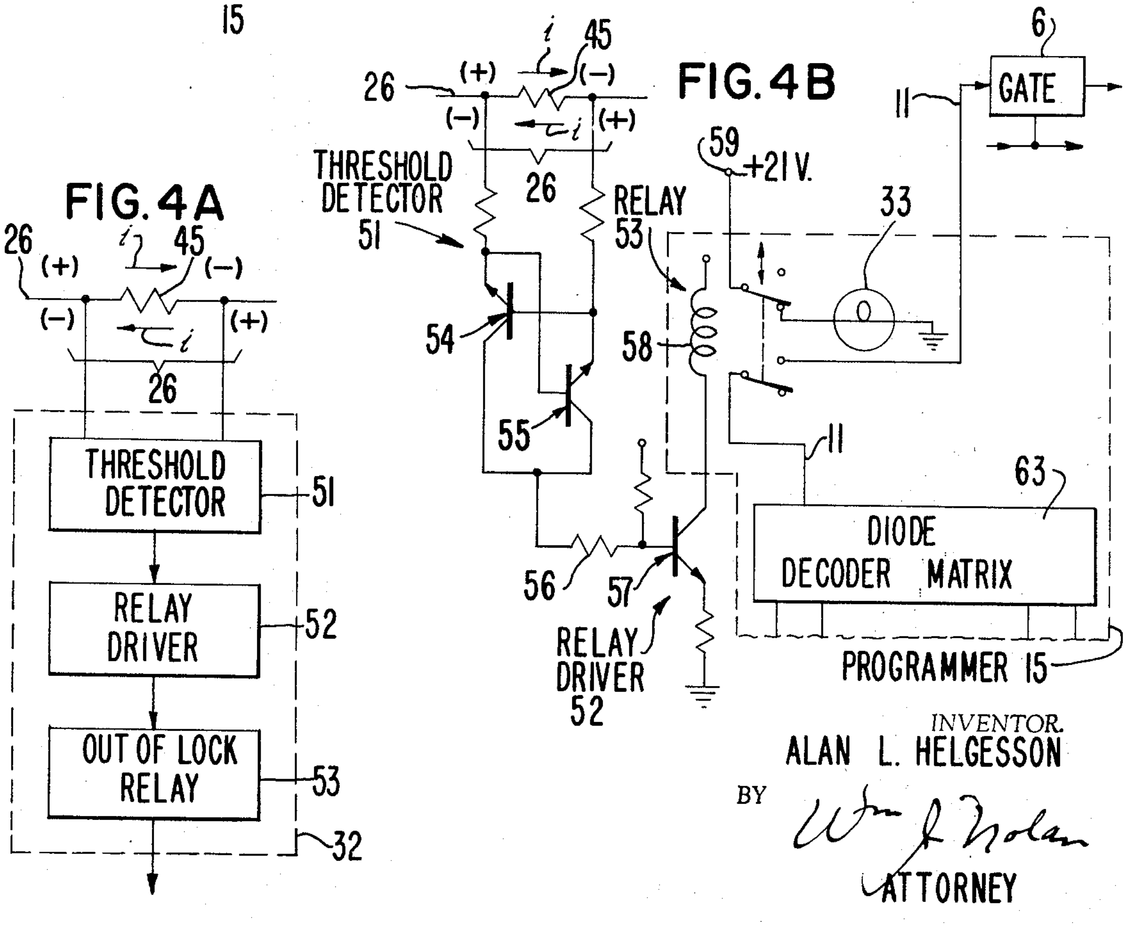

Referring now to FIGS. 4A and 4B the phase threshold inhibit circuit 32 is shown in greater detail. FIG. 4A shows one of the inhibit circuits in block diagram form. More specifically, the voltage developed across resistor 45 is sampled via output lines 26 and fed to the input of a threshold detector 51. The threshold detector 51 is shown in greater detail in FIG. 4B and comprises a circuit which will give an output signal when the input voltage derived via lines 26 falls below or above a certain operating range of voltages. The output of the threshold detector 51 is fed to a relay driver 52 which amplifies the signal and feeds the output thereof to an out-of-lock relay 53 which is contained internally of the programmer 15 and connected in each of the lines 11–14 between the gates 6–9 and the programmer 15. The out-of-lock relay 53 serves to open the circuit between the programmer 15 and the respective one of the gates 6–9 to prevent the output of the particular inhibited frequency standard from being applied to the bus 5.

Referring now to FIG. 4B the circuitry of the phase threshold inhibit circuit 32 is shown in greater detail. The threshold detector 51 includes a symmetrical connection of a first and second transistor 54 and 55, respectively, with the control voltages for the transistors 54 and 55 being derived across the resistor 45 in the output frequency control line 26. When the bias potential developed across resistor 45 is of one sense and greater than a certain minimum voltage determinative of the allowable phase difference between the master frequency standard and the particular slave standard, the bias potential developed across resistor 45 is sufficient to turn one of the transistors 54 or 55 ON to produce an output which is fed via resistor 56 to the base electrode of a relay driver transistor 57. The output of the relay driver transistor 57 is fed to the energizing coil 58 of the out-of-lock relay 53 to open the circuit between the input gate 6 and the respective one of the gate control lines 11–14 in the output of the programmer 15. When the out-of-lock relay 53 is opened the respective one of the frequency standards controlled by the relay is inhibited from being selected by the programmer 15. The relay 53 includes a second set of contacts which are closed by actuation of the relay 53 to connect an indicating lamp 33 to a source of potential 59 to indicate that that particular frequency standard is out-of-phase lock with the master.

When the amplitude of the voltage developed across the resistor 45 is within the normal operating range, indicating a phase lock relation between the master and that particular slave, there is no output in the output of the threshold detector 51 such that the relay 53 is in the closed position for connecting the respective output of the programmer to the respective one of the gates 6–9. In addition, the circuit between the source 59 and the indicating lamp 33 is open to extinguish the out-of-phase lock indicating lamp 33. The phase threshold inhibit circuit 32 includes a threshold detector 51, relay driver 52 and out-of-lock relay 53 for each one of the output lines 26–27 of the frequency control circuit 31.

As an alternative to the symmetrical connection of transistors 54 and 55 in the threshold detector circuit 51, a conventional double ended limit detector may be employed such as a Fairchild $\mu$ A711 double ended limit detector, see Fairchild application bulletin APP–116 of Feb. 19, 1966, page 8, FIGS. 13 and 14.

Figure 5:
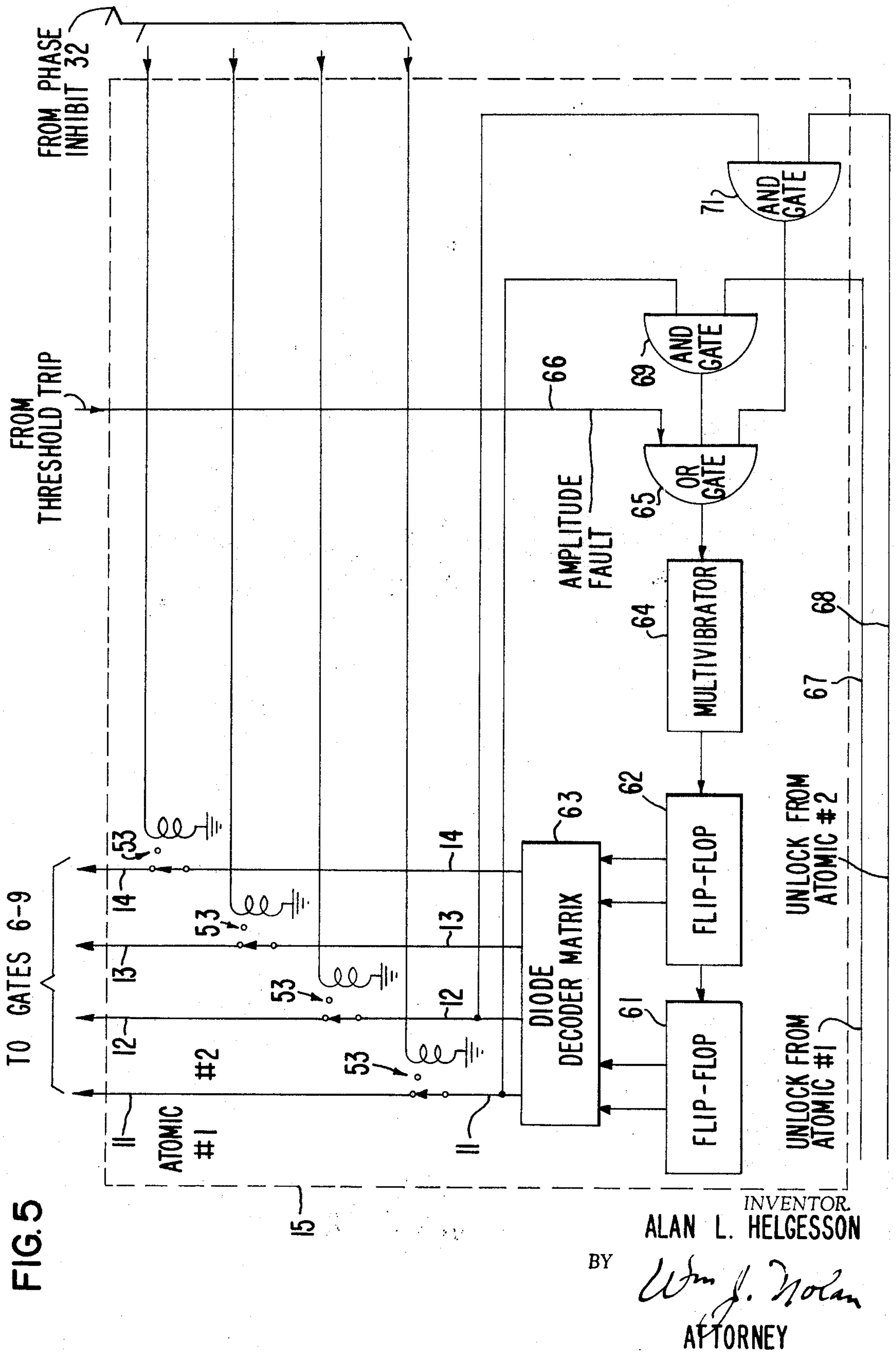

Referring now to FIG. 5 the programmer 15 is shown in greater detail. The programmer 15 includes a pair of flip-flops 61 and 62 connected as a counter in the conventional manner. The output of the flip-flops is fed to a conventional diode decoder matrix 63 which decodes the binary data outputs of the flip-flops 61 and 62 to energize a respective one of the output lines 11–14 for gating on a respective one of the frequency standards 1–4 according to the count in the output of the flip-flops 61 and 62. The diode decoder matrix is a conventional circuit and includes switches for interconnecting the output of the diode decoder matrix in any predetermined sequence for the outputs 11–14 of the diode decoder matrix 63.

A multivibrator 64 is provided for producing a train of pulses at a suitably high repetition frequency as of 100 kilohertz. The pulse output of the multivibrator supplies the trigger pulses to the flip-flops 61 and 62 for advancing the count in the output of the flip-flops 61 and 62. The operating potential for the multivibrator 64 is supplied to the multivibrator from the output of an OR gate 65.

Three inputs are supplied to the OR gate 65 to cause the potential to be applied to the multivibrator for advancing the count in the flip-flop circuits. One of the inputs to the OR gate 65 is derived from the output of the amplitude threshold trip circuit 35 via line 66. Thus, the presence of an output signal from the amplitude threshold trip circuit 35 causes the OR gate 65 to be actuated for applying the operating potential to the multivibrator to cause the flip-flop to advance to the next count to change the selection of the master frequency standard from a first master to a second by switching the output of the diode decoder matrix from a first one of the output lines 11–14 to a second one thereof. If the newly selected frequency standard is operating properly it will have sufficient amplitude detected by the amplitude threshold trip circuit 35 to extinguish the amplitude failure signal on line 66, thereby stopping the count in the flip-flop circuit causing same to remain on that particular newly selected master. However, if the newly selected master is out-of-phase lock relation with the previous master then the phase inhibit output from phase threshold inhibit circuit 32 will cause the particular relay 53 in the respective one of the output lines 11–14 to be in the open position such that even though the output of the diode decoder matrix 63 is such to normally open the respective one of the gates 6–9 that signal is inhibited from reaching the gate such that the gate cannot be opened and therefore no output will appear on the bus 5. The amplitude threshold trip circuits 35 will sense the absence of an output signal to cause the multivibrator to advance the count in the flip-flop circuit to select the next preferred standard.

In case the master atomic standard either 1 or 2 becomes unlocked, the unlock condition is detected internally of the frequency standard 1 or 2 and fed to the programmed 15 via lines 67 and 68. Lines 67 and 68 are connected to the inputs of respective AND gates 69 and 71 wherein they are ANDED with outputs selected from the respective ones of the output lines 11 and 12 of the diode decoder matrix 63 such that if the master standard, as determined by the output of the diode decoder matrix, also receives an unlocked alarm signal via line 67 an AND output will be obtained from the respective AND gate 69 and fed to OR gate 65 for causing the count in the counter to advance to the next selected standard.

Since many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

What is claimed is:

1. A frequency combiner apparatus wherein the outputs of at least three frequency standards are fed to the combiner and the combiner processes such outputs to provide its own output signal having improved reliability over that obtainable from any one of the standards taken alone, wherein the improvement comprises, means for selecting a first one of the frequency standards as a master and employing the output of that frequency standard as the output of the frequency combiner, means for phase locking the other frequency standard output signals to the phase of the master frequency standard, and including means for monitoring the master signal and programmer means for automatically switching to a second one of said phase locked frequency standards in accordance with a predetermined preference preset into said programmer means to provide a second master upon a failure of said first master frequency standard.

2. The apparatus of claim 1 including means for monitoring the phase difference between the output of the frequency combiner and the outputs of said phase locked standards, and means responsive to a monitored phase difference in excess of a predetermined amount for inhibiting said programmer from selecting said frequency standard having excessive phase shift from the master as a second master upon failure of said first master standard, whereby excessive time shifts in the output of the combiner are avoided upon switching from a first master standard to a second master standard.

3. The apparatus of claim 1 including a resonant crystal band pass filter tuned to the frequency of said master frequency standard and connected in the combiner to pass the master frequency standard signal to the output of the combiner, and said crystal filter having a decaying time constant in excess of the switching time of the combiner in switching from said first master standard to said second master standard, whereby the combiner output signal is maintained during the transient switching period from said first master to said second master.

4. The apparatus of claim 1 wherein said means for monitoring the master signal comprises means for monitoring the amplitude of the combiner output signal.

5. The apparatus of claim 1 wherein said plural frequency standards include one or more atomic resonant frequency standards, and wherein said means for monitoring the master signal includes means for monitoring the internal frequency lock of at least one of said atomic frequency standards when said atomic standard is employed as said master standard.

6. The apparatus of claim 1 wherein the frequency combiner includes a pair of parallel output channels through which the master signal is passed to a pair of separate output terminals of the frequency combiner, each parallel output channel including its own amplifier and crystal filter, whereby redundancy of the output is obtained.

(References on following page)

References Cited

UNITED STATES PATENTS

| | | | |
|---|---|---|---|
| 3,289,097 | 11/1966 | Martin | 331—49 |
| 3,329,905 | 7/1967 | Niertit et al. | 331—49 |
| 3,431,510 | 3/1969 | Reis et al. | 331—49 |

ROY LAKE, Primary Examiner

S. H. GRIMM, Assistant Examiner

U.S. Cl. X.R.

307—65, 81; 328—154; 331—25, 44, 49, 55, 77